Nov. 19, 1929.  E. M. BROGDEN  1,736,759
FRUIT TREATING APPARATUS
Original Filed July 23, 1923    2 Sheets-Sheet 2
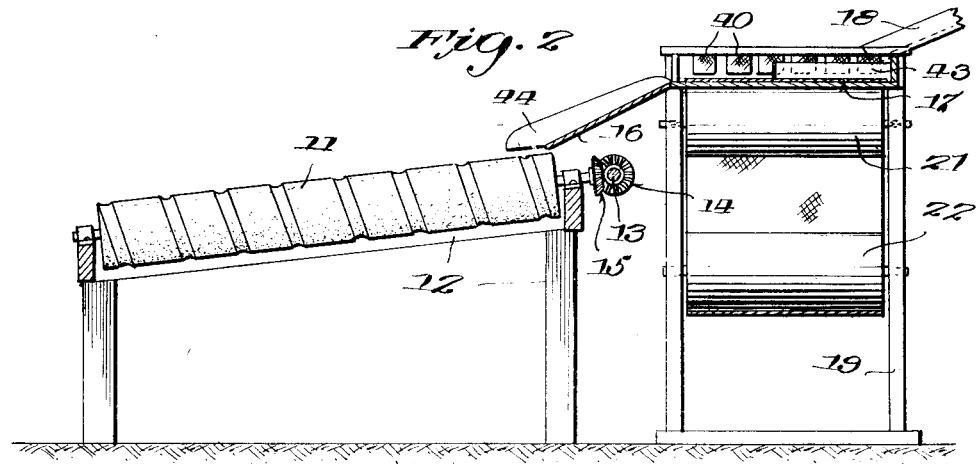
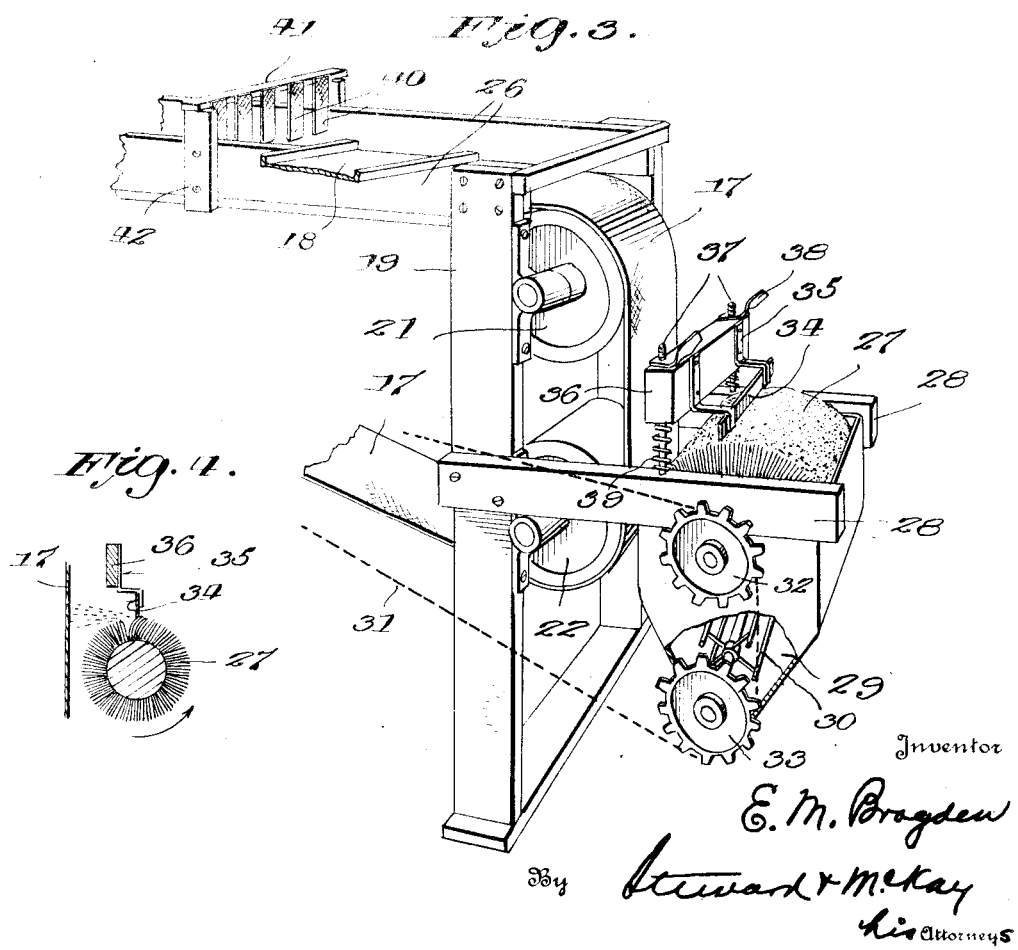
Inventor
E. M. Brogden
By Stewart & McKay
his Attorneys Patented Nov. 19, 1929

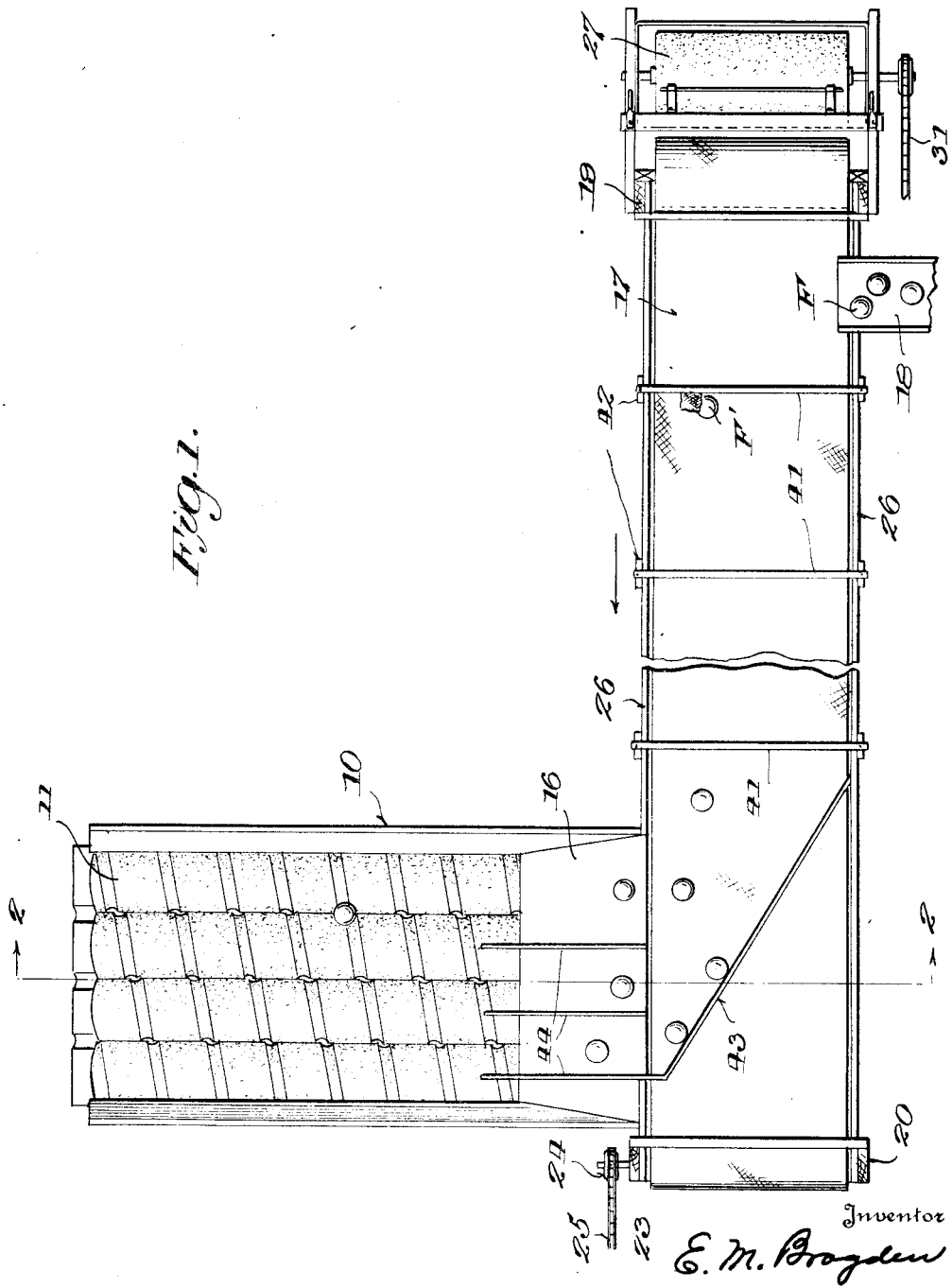

1,736,759

UNITED STATES PATENT OFFICE

ERNEST M. BROGDEN, OF POMONA, CALIFORNIA, ASSIGNOR TO BROGDEX COMPANY, OF WINTER HAVEN, FLORIDA, A CORPORATION OF FLORIDA

FRUIT-TREATING APPARATUS

Application filed July 23, 1923, Serial No. 653,225. Renewed August 22, 1928.

This invention relates to fruit treating apparatus; and it relates more particularly to apparatus for treating fruit or the like with a protective or preservative material in a manner to prevent, for an extended period of time, the fruit from rotting, withering, losing flavor or otherwise deteriorating.

In the treatment of fruit to which this novel apparatus relates, a material is employed which, when properly applied, forms a thin film-like coating upon the fruit having the protective and preservative properties mentioned. For example, compositions consisting of a waxy substance, such as paraffin wax, associated with a solvent or liquid vehicle of oily character, either volatile or non-volatile, such as gasoline, benzine, light mineral oils known as "white oils," medicinal oils, and the like, have been found suitable for use in the fruit treatment referred to. In the treatment of fruit with such compositions, a suitable quantity of the material is initially applied to the fruit and the fruit then subjected to a rubbing or brushing action to form the required film-like coating uniformly over its surface.

The present invention is directed to an improved apparatus for the referred-to treatment of fruit and the like, especially citrus fruit such as oranges, tangerines, grape-fruit and lemons, but including also a wide variety of other fruits, such for example as apples, pears, peaches, plums and cantaloupe, and even of vegetables such as cucumbers, tomatoes, and the like, where the shape and texture are such as to enable advantageous treatment. For the sake of convenience, the term "fruit", is employed in the appended claims, unless otherwise indicated, to include not only fruit, strictly speaking, but also vegetables, in so far as fruit, in this broad sense, can be treated with advantage by my novel apparatus.

A general object of the present invention is to provide an arrangement of apparatus operative to effect initial application of the coating material to the fruit in a relatively uniform manner but in suitably limited quantity, so that the subsequent brushing or rubbing action to which the fruit is subjected to obtain the desired very thin film-like protective coating may be accomplished with rapidity and dependability.

A further and more specific object is to accomplish the stated initial application of the coating material by rolling movement of the fruit, incidental to its travel toward the rubbing or brushing mechanism, in contact with a surface carrying a limited supply of said coating material, said rolling movement being relatively prolonged and, most desirably, being so diversified as to ensure turning of the fruit on several axes, while in contact with said surface.

Still another object is to provide simple adjustable means for supplying coating material to the aforesaid surface in quantity and manner best adapted for the purposes in view.

Other objects and advantages of the invention will appear as the description proceeds.

In the apparatus of the present invention parallel revoluble and inclined brush rolls cooperating to provide one or more fruit runways are most advantageously employed as the fruit-brushing means to effect the formation of the coating from the material initially applied to the fruit.

To attain the desired initial application of the coating material to the fruit, the invention contemplates a combined applicator and fruit-feeding means, specifically of the endless carrier belt type, effecting a prolongation of the feeding movement of the fruit toward the brushes upon the carrier surface, and with means associated therewith effecting turning movements of the fruit about constantly varying axes during such feeding movement, the prolonged and varied movements of the fruit in contact with the coating material on the carrier surface providing the desired extended initial application of the coating material over the surface of the fruit.

In association with the foregoing, the invention also comprises, most desirably, improved means for supplying the fluent coating material to the carrier or applicator surface, with a view to supplying the material in the form of a spray evenly distributed over that surface, avoiding frictional engagement of that surface by any mechanical elements of the material-supplying means, and enabling a ready control of the quantity supplied. In the preferred embodiment of the invention hereinafter described, the improved material-supplying means includes as elements thereof a brush-roll dipping into a container of fluent coating material, but with the brush-roll spaced from the carrier belt or applicator to avoid frictional contact therewith, and with a brush-engaging means associated with the brush roll to effect, upon rotation of the roll, a spraying of the material from the brush upon the applicator surface, the brush-roll and brush-engaging means being relatively adjustable to enable a precise regulation of the quantity of the coating material projected from the brush roll.

The invention will be best understood from the description hereinafter given of a preferred concrete embodiment thereof, also exemplified in the apparatus shown in the accompanying drawings forming a part hereof, and from a description how such apparatus may be used in the treatment of fruit referred to. It is to be understood, however, that the embodiment referred to is merely illustrative and that within the broad scope of the invention are included other specific constructions capable of functioning in accordance with the principles here involved.

In the drawings:

Fig. 1 is a top plan view of apparatus constructed in accordance with my invention;

Fig. 2 is a perpendicular cross-sectional view on the line 2—2 of Fig. 1, looking in the direction of the arrows;

Fig. 3 is a perspective view of an end portion of the apparatus remote from the fruit-brushing unit, showing the parts supplying the fluent coating material to the carrier belt; and Fig. 4 is a diagrammatic view to illustrate the operation of the parts supplying the fluent coating material to the carrier belt.

Any fruit brushing machine or unit effective in forming a thin uniform coating upon the fruit from fluent coating material initially applied thereto may be employed. In the construction chosen to illustrate the principles of the invention the apparatus as a whole may conveniently include, substantially unmodified, a fruit brushing or polishing machine indicated generally at 10. The inclined parallel brush rolls of this type of polisher are indicated at 11. A plurality of such rolls may be provided, four being shown by way of example, rotatably mounted in the main framework 12 of the machine. These brush rolls are driven in the same direction of rotation from the driving shaft 13 by means of the cooperating bevel gears 14, 15, as shown in Fig. 2.

The cylindrical brush rolls 11 here employed may be of the type in which the rubbing or brushing surfaces are formed of horse-hair bristles, the rolls cooperating in pairs to provide between the rolls of each pair a trough-like runway for the fruit gently sloping from the upper or receiving end of the polisher to the lower or discharge end as shown in Fig. 2. The usual type of feeding chute, inclined toward the brush rolls to deliver the fruit thereto, is indicated at 16.

Associated with the fruit brushing machine described as one which may conveniently be employed in my novel apparatus, are the particular apparatus parts functioning to initially apply the fluent coating material to the fruit and to convey the fruit to the brushing unit.

In the illustrative apparatus, an endless carrier belt 17 is employed to convey the fruit from a fruit-receiving point relatively remote from the brushing unit to that unit, the belt also functioning in cooperation with other operating means, later to be described, to initially apply the fluent coating material to the fruit on its way to the brushing unit.

The precise location and mounting of the carrier belt with respect to the fruit brushing unit is immaterial provided its arrangement is such as to accomplish the functions stated. In the illustrative apparatus, as shown in Figs. 1 and 2, the upper run of the belt is disposed in a horizontal plane at right angles to the brushing unit, with one portion closely adjacent the chute 16 of the brushing unit in position to deliver fruit directly thereto and with its opposite or receiving portion extending beyond the chute 18 through which the fruit to be treated is delivered to the belt.

A framework for mounting the carrier belt is provided, comprising standards 19 at one end, remote from the brushing unit, and 20 at the end adjacent that unit, the belt being trained over vertically spaced pulleys 21, 22 journaled in bearings on the standards 19, and about a single pulley 23 journaled in bearings on the standards 20. Any suitable means may be employed for driving the belt, a sprocket 24 being shown fixed to the extended shaft of the pulley 23 and driven by the chain 25. Side rails 26, extending between the standards 19 and 20, and adjacent the opposite side edges of the belt, serve not only to complete the framework but also to prevent the fruit from running off the belt.

The means for supplying the fluent coating material to the carrier belt, to be taken up therefrom by the fruit, comprises in this illustrative example a brush roll 27 rotatably mounted in bearings on the extended framework 28, the brush roll depending into a container 29 of the fluent coating material, the container being likewise mounted on the framework 28. A rotatably driven stirrer or agitator 30, mounted in the bottom portion of the container, serves to maintain the constituents of the coating material in a thoroughly mixed condition. The brush roll and agitator are driven by the common drive-chain 31 and the sprockets 32 and 33 mounted on their respective shafts.

A straight-edged bar 34, supported by brackets 35, upon the block 36, in position to penetrate the peripheral brush surface of the roll and to flex the bristles of the brush upon rotation of the bar, constitutes a suitable embodiment of means cooperating with the brush to project coating material therefrom upon the carrier belt. The brush surface is constituted by relatively stiff but flexible material such as Tampico fibre, and with the parts arranged as viewed in Fig. 3, and the brush rotating counter-clock-wise, the bristles of the brush in passing under the bar 34 are first flexed in a direction away from the vertically extending portion of the belt 17 and then abruptly released as the bar is cleared, their resiliency causing their quick return and a projection of fluent coating material upon the belt in the form of droplets or spray. Fig. 4 diagrammatically illustrates this flexing action of the bar upon the brush.

The quantity of material projected from the brush to the carrier belt obviously depends largely upon the extent of the flexing action referred to, which in turn depends upon the position of the bar 34 with respect to the brush surface. With the parts arranged as viewed in Fig. 3, a downward adjustment of the bar 34 increases its flexing action upon the brush bristles and an upward adjustment decreases that action, until, upon an elevation of the bar clear of the brush surface the parts no longer operate to deliver coating material to the belt. To provide for the adjustment referred to, the supporting block 36 is mounted for vertical adjustment upon the rods 37, anchored in the framework 28 and extending vertically upward therefrom, the rods extending loosely through bores vertically disposed in the block adjacent its opposed ends, and the block being spring-pressed upward against the wing nuts 38 by springs 39 surrounding the rods, adjustment of the wing nuts determining the vertical position of the block and hence of the brush-engaging bar 34 supported therefrom.

The foregoing arrangement of rotating brush-roll and brush-engaging bar provides for a delivery of the fluent coating material upon the surface of the carrier belt in a spray-like form readily taken up by the fruit in movement upon the carrier surface; and, what is especially important, it also permits of a close and accurate control of the amount of coating material supplied to the belt and hence to the fruit.

The delivery of the fruit by the inclined chute 18 to the carrier belt provides an initial rolling movement of the fruit over the carrier surface, which effects a substantial application of the fluent coating material to the fruit. Additional means are preferably provided designed to continue and to vary the rolling movements of the fruit upon the carrier surface as the fruit is being conveyed by the carrier to the fruit-brushing unit. In the illustrative apparatus such means comprise flexible strip elements 40 secured at one end to a cross-piece 41 mounted above the upper run of the belt upon the uprights 42, the strip elements depending from the cross piece to engage the fruit upon the carrier. These strip elements may be of any material of sufficient body and of such texture as to cause turning movements of the fruit by frictional engagement therewith. Strips of canvas or carpet, among other woven fabric materials, are suitable for the purpose. As shown in Fig. 1, a plurality of cross pieces 41 are provided spaced along the carrier belt, and each cross piece supports a plurality or set of the flexible strip elements such as shown in Fig. 3. By this arrangement, as the fruit is being bodily transported by the carrier belt toward the fruit brushing unit, successive turning movements about constantly varying axes are imparted to the fruit upon the carrier surface, resulting, by the time the feeding movement of the fruit to the brushing unit is completed, in an initial application of the fluent coating material to each piece of fruit over an extended area of its surface.

Any suitable means or arrangement of apparatus parts may be employed to effect a delivery of the fruit from the carrier or conveyor belt to the chute board of the brushing unit. In the illustrative apparatus here shown, such means comprises a guide rail 43 disposed obliquely of the upper run of the belt to limit the forward feeding movement of the fruit by the carrier and to deflect the fruit from the carrier surface to the chute board 16 of the brushing unit. In order to more uniformly distribute the fruit to the brush runways, guide rails 44 may desirably be secured to the chute board longitudinally thereof and extend over the brush rolls for a short distance as shown in Fig. 2.

In a typical example of use of the apparatus in the treatment of fruit with a preservative coating material, fruit such as oranges, indicated by the letter F, delivered to the carrier belt 17, for example as by the inclined chute 18, or in any desired way, is bodily transported by the carrier belt, toward the brushing unit, the fruit generally having some initial rolling movement over the surface of the belt from the manner of its delivery thereto. As the pieces of fruit progress toward the brushing unit, they come into engagement at varying angles with the flexible elements 40 depending into their pathway, one such engagement being indicated in Fig. 1 with the piece of fruit F', just emerging therefrom. By such engagements, rolling and turning movements about ever varying axes are imparted to the fruit upon the surface of the carrier, resulting, during the relatively prolonged feeding movement of the fruit, in an application of the fluent coating material from the surface of the carrier to each piece of fruit over an extended area of its surface.

The fruit with the initial application of the coating material thereon, advances directly from the carrier belt over the chute board of the brushing unit to the brush runways, and in the rolling and turning progress of the fruit along the runways, the coating material is distributed uniformly over the surface of each piece of fruit in the required film-like coating by the brushing action of the rolls.

What I claim is:

1. Apparatus for applying fluent material to fruit comprising the combination, with fruit-brushing means, of means for feeding fruit to said fruit-brushing means, said feeding means comprising a driven element having a continuous surface moving toward said fruit-brushing means and adapted to bodily transport said fruit, means for applying fluent material to said surface, and means operative to impart rolling movements to said fruit upon said surface.

2. Apparatus for applying fluent material to fruit comprising the combination, with fruit-brushing means, of means for feeding fruit to said brushing means, said fruit feeding means having a surface determining the path of movement of said fruit toward said brushing means, means for applying fluent material to said surface, and a plurality of flexible strip elements mounted adjacent said surface and adapted to engage fruit advancing toward said fruit brushing means to thereby impart turning movements to said fruit in contact with said surface.

3. Apparatus for applying fluent material to fruit comprising, in combination, a driven endless-surface fruit conveyor and driving means therefor, means for applying fluent material to the surface of said conveyor, means to deliver fruit to said conveyor, means mounted adjacent said surface operating to engage and impart rolling movements to the fruit upon said conveyor, and means arranged to receive fruit from said conveyor and to distribute adhering fluent material thereover.

4. Apparatus for applying fluent material to fruit comprising, the combination, with a fruit-brushing machine, of an endless carrier belt adapted to convey fruit to said brushing machine, means for applying fluent material to said belt, and flexible strip elements mounted upon fixed supports above said belt and depending therefrom to engage fruit upon said belt.

5. Apparatus for applying fluid material to fruit comprising the combination, with fruit-brushing mechanism, of an endless conveyor adapted and arranged to carry and deliver fruit to said mechanism, lateral guard means to keep the fruit on the conveyor until delivered to said mechanism, adjustable means for spraying fluid material upon the carrying surface of said conveyor, and means for feeding fruit to said conveyor for carriage to said mechanism.

6. Apparatus for applying fluent material to fruit comprising, in combination, a traveling carrier belt, a rotatably driven brush roll and means for supplying a fluent coating material thereto, a brush-engaging element, said brush roll and element being cooperatively arranged adjacent to but out of contact with said belt to project fluent material on to said belt, means to deliver fruit to said belt and to impart rolling movements of said fruit thereon, and means arranged to receive fruit from said belt and to distribute adhering fluent material thereover.

7. Apparatus for treating fruit comprising, in combination, a traveling carrier belt, a rotatably driven brush roll and means for supplying fluent material thereto, a brush-engaging element, said brush roll and element being cooperatively arranged adjacent to but out of contact with said belt to project fluent material on to said belt, means to adjust the degree of engagement of said element with said brush whereby the quantity of material projected is varied, means to deliver fruit to said belt and to impart rolling movements of said fruit thereon and means arranged to receive fruit from said belt and to distribute adhering fluent material thereover.

8. Apparatus for applying fluent material to fruit comprising, in combination, a traveling carrier-belt, a supply container for fluent material, a rotatably driven brush roll depending therein, a brush-engaging element, said brush roll and element being cooperatively arranged adjacent to but out of contact with said belt to project fluent material from said container to said belt, means to deliver fruit to said belt and to impart rolling movements of said fruit thereon, and means arranged to receive fruit from said belt and to distribute adhering fluent material thereover.

9. The combination, with a fruit brushing machine, of an endless-belt fruit conveyor arranged to convey fruit from a relatively remote fruit-receiving point to said machine, a brush roll rotatably mounted adjacent the turn of said belt remote from said machine, a supply container of fluent material mounted below said brush roll, said brush roll depending into said container, a bar adjustably mounted above said brush roll to engage and flex the bristles of said brush roll upon rotation of said roll, whereby fluent material is projected from said brush roll upon said belt in one direction of rotation of said roll, means for driving said brush roll in said direction to cause said projection of fluent material upon said belt, and means to adjust the deflecting engagement of said bar with said brush roll.

10. Apparatus for applying fluent material to fruit comprising the combination, with fruit-rubbing means, of means for feeding fruit to said fruit-rubbing means, such fruit feeding means having a surface traversed by said fruit, and means, comprising a rotatable brush supplied with fluent material and a relatively fixed cooperating brush-engaging member, for projecting fluent material upon said surface.

11. Apparatus for applying coating material to fruit comprising the combination, with fruit brushing mechanism, of a driven endless carrier and applicator belt adapted and arranged to bodily carry and deliver fruit to said brushing mechanism, means for supplying spreadable coating material to said belt for application to fruit thereon, and means associated with said belt and operative to effect turning movements of the fruit about varying axes as the fruit is being carried by said belt toward said brushing mechanism.

In testimony whereof I hereunto affix my signature.

ERNEST M. BROGDEN.